United States Patent [19]

Manning et al.

[11] 3,802,111
[45] Apr. 9, 1974

[54] FISHING APPARATUS WITH FISHHOOK DISENGAGER

[76] Inventors: George H. Manning, 1512 N. Pine St.; Marion C. Pritchett, 823½ W. 5th St., both of Grand Island, Nebr. 68801

[22] Filed: Jan. 22, 1973

[21] Appl. No.: 325,453

[52] U.S. Cl. .............................................. 43/17.2
[51] Int. Cl. ........................................... A01k 97/00
[58] Field of Search ..................................... 43/17.2

[56] References Cited
UNITED STATES PATENTS
2,948,077  8/1960  Karpes .............................. 43/17.2
3,036,397  5/1962  Canada, Sr. ....................... 43/17.2

*Primary Examiner*—Hugh R. Chamblee
*Assistant Examiner*—Daniel J. Leach
*Attorney, Agent, or Firm*—George R. Nimmer

[57] ABSTRACT

Fishing apparatus comprising the combination of an elongate finite-length rod and having a relatively large reel mounted thereon for convolutely wound flexible fishing line that extends forwardly to and beyond the rod free-end so that the submersible fishhook at the fishing line lead-terminal portion is forwardly beyond the rod free-end. The fishing apparatus also includes a fishhook disengager portion comprising an elongate pole movable substantially parallel along the comparatively more flexible and shorter rod, the pole at the forward distal-end having a rigidly mounted fully enclosed annulus that is sufficiently large to surroundably pass over the reel and being fully enclosed whereby its surrounding relationship with the fishing line forwardly of the rod free-end is maintained during vigorous manipulation thereof at the snagged fishhook.

4 Claims, 4 Drawing Figures

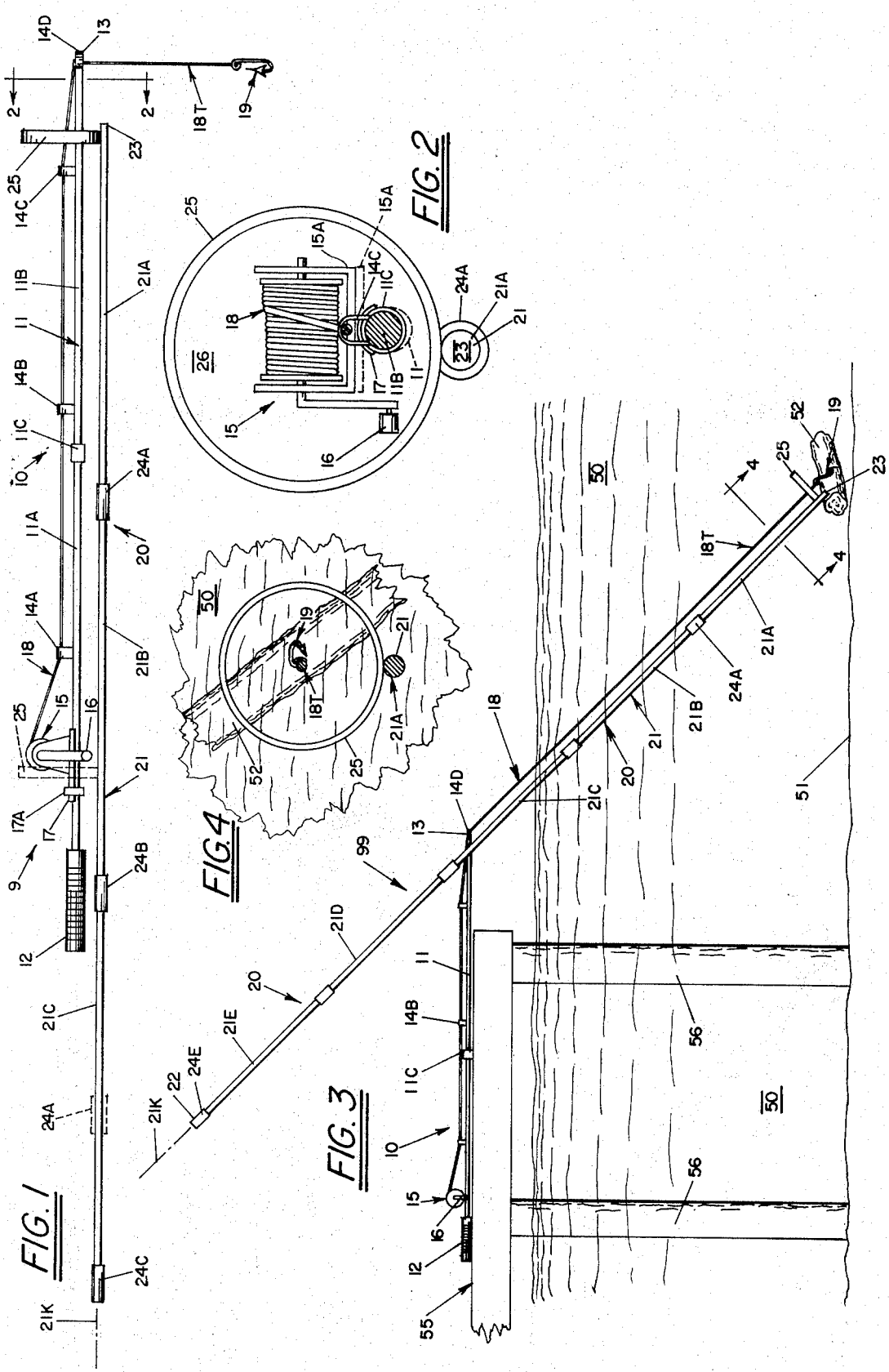

FISHING APPARATUS WITH FISHHOOK DISENGAGER

Fishing apparatus typically comprises an elongate resiliently flexible rod having a finite-length from its handle-end to its free-end, there being a plurality of eyelets spaced consecutively therealong. A fairly massive large reel is mounted to the rod for carrying a convolutely wound supply of flexible fishing line that extends longitudinally forwardly from the reel through the consecutive eyelets and beyond the rod free-end whereby the fishing line lead-terminal portion is provided with a submersible fishhook means, the fishhook means sometimes being embodied into a lure. Fishing is frequently done in waters in which aquatic plants are growing, and in which the body of water is covered with stumps, water-logged wood, brush, discarded objects and other debris. Under such conditions, the fishhooks and ancillary lures employed at the fishing line lead-terminal portion frequently become entangled or "snagged" with such debris obstructions. When a fishhook device becomes entangled, the fisherman usually tensions the fishing line and thus "sets" the fishhook more firmly in the obstruction. In many instances, the fishhook, the lure, and a substantial portion of the fishing line are lost, which is a particularly aggravating occurrence for fishermen.

For many years fishermen have sought a usable disengager means for snagged submerged fishhooks and ancillary lures. Prior art workers have largely concluded that the disengager means should depend upon a forward pushing type action against the snagged fishhook, it having long been recognized that rearward pulling type actions (as by tensioning the fishing line) would only aggravate the snagged condition. Illustrating such pushing type disengager means for submerged fishhooks and ancillary lures are the prior U.S. Pat. Nos. 2,768,462 (Younce - Oct. 30, 1956) and 2,950,558 (Karpes - Aug. 30, 1960). However, the pushing type disengaging means of the prior art require very precise and adroit manipulation thereof at the site of the submerged snag, which is exceedingly difficult if the water is murky, if the snag is deeply submerged, or if the snag is horizontally remote from a shoreline fisherman. Moreover, many of the prior art pushing type disengaging means for submerged snags have a tendency to themselves become entangled with the fishing line, or to even damage or immobilize same.

It is accordingly the general object of the present invention to provide a pushing type disengaging means for snagged submerged fishhooks and ancillary lures that does not depend to a great extent upon the fisherman's ability to closely visually scrutinize the snag, nor require him to utilize unusually precise physical adroitness. It is an ancillary general object to provide a pushing type fishhook disengager means that is quick and reliable, thus sparing the fisherman frustration and anguish.

It is a specific object to provide a disengaging means for submerged fishhooks and ancillary lures thereby acting as a retriever for them, and wherein the fishing line can be reliably employed to help locate the snagged object whereby success need not wholly depend upon visual perception of a remotely positioned fisherman. It is an ancillary object to provide a fishhook retriever or disengager means that does not become entangled with nor immobilizes the submerged fishing line.

It is another object to provide a disengager for snagged submerged fishhooks and/or lures that is amenable to positive vigorous action and control by the fisherman.

It is yet another object to provide a fishing apparatus having fishhook disengaging means that is of simple and economical construction and fabrication, that is amenable for handy use by the fisherman, that can be made of compact form for interim storage and travel, and that can be readily kept clean and operational.

With the above and other objects and advantages in view, which will become more apparent as this description proceeds, the fishing apparatus of the present invention generally comprises an elongate resiliently flexible rod extending longitudinally forwardly from its handle-end to its free-end and having a reel convolute supply or fishing line mounted thereto, the fishing line extending forwardly from the reel to and beyond the rod free-end whereby the fishing line lead-terminal portion is provided with a submersible fishhook means, and also comprising a fishhook disengager including a relatively inflexible elongate pole normally extending in substantial movable parallelism along the rod, the pole having a forward distal-end and a proximal-end defining the pole axial-length which exceeds the rod finite-length by a factor of at least two, the fishhook disengager also including a fully closed rigid annulus rigidly attached to the pole near its distal-end, the plane of the annulus fully closed opening lying substantially perpendicular to the pole-axis and being sufficiently large to surroundably pass over the large reel when the pole is moved parallel to the rod, the fully closed annulus when forward of the rod free-end permanently surrounding the fishing line which ensures that the annulus will be directed toward and maintained at the situs of the submerged snagged fishhook.

In the drawing, wherein like characters refer to like parts in the several views, and in which:

FIG. 1 is a side elevational view of a representative embodiment of the fishing apparatus with fishhook disengager of the present invention.

FIG. 2 is a sectional elevational view taken along line 2—2 of FIG. 1.

FIG. 3 is a side elevational view of the FIG. 1 embodiment as might actually be employed while affirmatively disengaging a snagged submerged fishhook.

FIG. 4 is a sectional elevational view taken along line 4—4 of FIG. 3.

Referring initially to FIGS. 1 and 2, which shows a typical embodiment 9 of the fishing apparatus with fishhook disengager, it is to be understood that there is included some selected type of conventional rod-and-reel fishing tackle, e.g., 10. Such typical rod-and-reel fishing tackle 10 generally comprises an elongate rod 11 extending linearly longitudinally forwardly for a finite-length from its rearward handle-end 12 to its forward free-end 13, rod 11 being resiliently flexible along its length as indicated in phantom line in FIG. 2. Rod 11 is herein typically provided with a plurality of eyelets (e.g., 14A, 14B, 14C) spaced consecutively along the rod-axis, and usually a forward eyelet (e.g., 14D) at the rod free-end 13, said several eyelets 14A – 14D being employed as guide means for the flexible fishing line 18. Oftentimes the rod 11 is provided with a plurality of removably connected sections, herein as sections 11A and 11B removably threadedly connected with socket 11C.

The rod-and-reel portion 10 also comprises a reel member 15, which as seen in FIG. 2 is fairly massive as compared to the cross-sectional size of rod 11. Reel members are customarily located on and mounted to the rod nearer its rearward handle-end (12) than to its forward free-end (13). Herein, the reel mounting means comprises a curvilinear underlying bracket 17 which is attached to both the reel (at reel lower plate 15A) and to the rod 11A through band 17A. Reel 15 carries a convolutely wound supply of flexible fishing line 18 which proceeds longitudinally forwardly therefrom through the consecutive eyelets (14A – 14D), and hence to and even beyond the rod free-end 13. The fishing line lead-terminal portion 18T is provided with a submersible fishhook means (e.g., 19), sometimes including a lure, for engaging aquatic fish. As is well known in the art, the distance of the fishhook 15 from the rod free-end 13 depends upon directional rotations of reel 15, the fishing line 18 also being manually retractable onto reel 15 with rotatable crank 16.

The fishhook disengager portion 20 of the fishing apparatus 9 comprises two main constituents including an elongate pole 21 and a fully-closed rigid annulus 25 rigidly positioned at the pole forward distal-end 23. Elongate pole 21 extends linearly longitudinally along a pole-axis 21K which in the "ready" condition for fishhook disengager 20 (FIGS. 1 and 2) normally extends substantially parallel to the elongate rod 11. Pole 21 has (between forward distal-end 23 and a rearward proximal-end 22) a longitudinally extending axial-length (herein along 21K) which greatly exceeds the rod finite-length. For reasons to be explained later, and as alluded to in FIG. 2, the pole 21 is relatively rigid, i.e., necessarily less flexible, than rod 11. For purposes of interim storage and portability, as well as for convenient use, pole 21 is preferably provided with a plurality of removably connected lineal segments, herein as equal-length segments (e.g., 21A – 21E, etc.) removably threadedly connected end-to-end with fittings (e.g., 24A – 24E, etc.). While the pole 21 in the FIG. 1 "ready" condition might have a relatively short length, the employment of additional segments is appropriate to provide a longer pole 21 depending upon the distance of the submerged snag (e.g., 52) from the fisherman (e.g., at 55). For example, in the FIG. 3 apparatus "use" condition 99, the pole axial-length (22–23) would exceed the rod finite-length by a factor of at least two or three.

The fully closed rigid annulus 25 is rigidly attached to elongate pole 21 substantially at the forward distal-end 23 thereof, herein to pole first segment 21A. Annulus 25 is herein defined by heavy metallic rod stock bent into a rigid fully closed ring which is substantially perpendicular to pole-axis 21K. Thus, the plane of the annulus fully closed opening 26 lies permanently substantially perpendicular to pole-axis 21. Annulus 25 in the FIG. 1 "ready" condition surrounds rod 11 so that pole 21 can be moved manually (along pole-axis 21K) substantially parallel to the rod 11. Moreover, the fully closed opening 26 of annulus 25 is sufficiently large to surroundably pass over the large reel (15) when pole 21 is moed rearwardly along 21K.

Thus, the fishhook disengager portion 20 is readily resiliently axially separable from the rod-and-reel portion 10, as indicated in phantom line in FIG. 1. However, when pole 21 is moved sufficiently forwardly, annulus 25 surrounds fishing line 18 forwardly of rod free-end 13. Inasmuch as annulus 25 is fully closed, and irrespective of the precise geometric form therefor, said annulus is confined to (and cannot be laterally liberated from) fishing line 18 even though it is located forwardly of the rod free-end 23. Thus, fishing line 18 serves to assuredly convey or direct the annulus 25 toward the submerged snagged fishhook (e.g., 19 at 52), even though the snag be visually obscured or remote from the fisherman, e.g., at 50. Moreover, the fully closed annulus 25 will remain in surrounding relationship with the fishing-line lead-terminal portion 18T even though the pole (carrying herein circular annulus 25) be jabbed vigorously and indiscriminately at the snagged submerged fishhook.

Operation and use of the fishing apparatus, although having been alluded to, might be summarized as follows. It might be assumed in a typical angling situation that a fisherman might be stationed upon a dock 55 having vertical piles 56 embedded into the earthen floor 51 of a river 50. It might be further assumed that the fishhook means 19 of the rod-and-reel portion 10 had become snagged upon debris 52 submerged at the bottom 51 of water body 50. Upon encountering this snagged condition, as exhibited at non-retractable reel 15, the fisherman would commence moving the pole 21 forwardly along pole-axis 21K and substantially parallel to rod 11, as alluded to in FIG. 1. Then, as the fisherman remains on dock 55, he keeps moving the pole portion 21 of disengager 20 increasingly forwardly and downwardly of rod free-end 13, adding additional pole segments 21D, 21E, ... 21n, until the annulus portion 25 encounters resistance. The resistance encountered would almost assuredly be the snagged submerged fishhook 19 inasmuch as the fishing line 18 helps direct the fully closed annulus 25 to the snagged debris, e.g., 52. At this juncture, the fisherman wielding the pole 21 in spearlike fashion from the dock 55 can jab vigorously, and relatively indiscriminately, toward the snagged debris 52, the rammed annulus usually resulting in disengagement of the fishhook from the debris and without breaking the line 18. When the task is accomplished, the fisherman then simply pulls rearwardly upwardly on oblique pole 21 until annulus 25 reaches surrounding relationship to rod free-end 13. Then, he moves pole 21 parallel to rod 11 and even rearwardly of rod handle-end 12, which permits ready clearing of annulus 25.

From the foregoing, the construction and operation of the fishing apparatus will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. In a fishing apparatus comprising an elongate rod extending linearly longitudinally forwardly for a finite-length from its handle-end to its free-end, said elongate rod being resiliently flexible along its finite-length and being provided with a plurality of eyelets spaced consecutively therealong, and also comprising a reel mounted to the rod longitudinally nearer the rod handle-end, said reel being provided with a convolutely wound supply of flexible fishing line that extends longitudinally forwardly from the reel through the consecutive eyelets and beyond the rod free-end whereby the fishing line lead-terminal portion is provided with a submersible fishhook means for engaging aquatic fish, the improvement of a fishhook disengager for use in disengaging a fishhook from snagged submerged debris, said fishhook disengager comprising:

A. An elongate pole normally extending linearly longitudinally along a pole-axis and substantially parallel to the said elongate rod, said pole having a forward distal-end and a proximal-end defining the pole longitudinally extending axial-length which exceeds said rod finite-length by a factor of at least three, said elongate pole per length unit thereof being relatively more rigid than said resiliently flexible rod, said lengthy pole comprising a plurality of lineal segments removably connected in end-to-end relationship; and B. A fully-closed rigid annulus rigidly attached to the elongate pole substantially at the distal-end thereof, the plane of the fully closed annulus lying substantially perpendicular to the pole-axis, the annulus fully closed opening being sufficiently large to pass over the reel when the pole is moved forwardly along and parallel to the elongate rod, said fully closed annulus whenever the forwardly longitudinally movable pole has its distal-end positioned forwardly of the rod free-end and surrounding the fishing line being capable of pushing toward and disengaging the submerged snagged fishhook and without being laterally liberated from the annularly surrounded fishing line.

2. The fishing apparatus of claim 1 wherein the reel includes a manually rotatable crank for retracting flexible fishing line thereonto, the fully closed annulus being sufficiently large of circular shape to surroundably pass over the reel including the crank therefor when the pole portion is moved rearwardly parallel along the elongate rod.

3. The method for disengaging a remotely located snagged fishhook portion of rod-and-reel type fishing tackle while the fisherman remains located remote from the debris snagged fishhook, said fishing tackle including an elongate rod extending in length linearly longitudinally from its handle-end to its free-end, the elongate rod being resiliently flexible along its finite-length and being provided with a plurality of eyelets spaced consecutively therealong, the fishing tackle also including a reel mounted to the rod nearer the handle-end which reel is provided with a convolutely wound supply of flexible fishing line extending longitudinally forwardly through the consecutive eyelets and beyond the rod free-end, the fishing line extending obliquely forwardly and downwardly from the rod free-end and being terminally provided with a said submersible fishhook, said disengaging method comprising the following steps in order:

A. Moving a linear elongate pole substantially parallel to and forwardly along the length of said elongate fishing tackle rod, said pole having a forward distal-end and a rearward proximal-end whereby the pole has a longitudinal axial-length extending along a linear pole-axis that exceeds the rod finite-length, said elongate pole per length unit thereof being relatively more rigid than said resiliently flexible rod, there being a fully closed annulus attached to the pole distal-end and rigidly maintained within a plane lying substantially perpendicular to the pole-axis, the annulus fully closed opening surroundably passing over the reel and thereafter forwardly beyond the rod free-end during the course of this first method step;

B. Elevating the elongate pole rearward proximal-end as the annulus has become so positioned forwardly of the rod free-end and surrounding the fishing line, said elevated proximal-end providing a non-parallel relationship between the rod and pole;

C. Jabbing the obliquely positioned elongate pole downwardly and forwardly parallel to the fishing line and ultimately against the remotely located debris to free the snagged fishhook therefrom;

D. Moving the pole obliquely upwardly and rearwardly along the freed fishing line until the fully closed annulus has reached the rod free-end; and E. Moving the pole substantially parallel to and rearwardly along the rod until the fully-closed annulus has become positioned rearwardly of the reel.

4. The method of claim 3 wherein the elongate pole comprises a plurality of lineal segments collectively exceeding the rod finite-length by a factor of at least three, the respective pole segments being sequentially removably connected in end-to-end relationship while the fully closed annulus of the first pole segment is being moved forwardly, and said pole segments after the snagged fishhook has become disengaged being sequentially wholly disconnected and while the fully closed annulus is being moved rearwardly toward the fisherman.

* * * * *